United States Patent [19]

Brueck

[11] 4,130,109
[45] Dec. 19, 1978

[54] SOLAR ENERGY CONCENTRATOR

[76] Inventor: Chris M. Brueck, 615 Chestnut, Muscatine, Iowa 52761

[21] Appl. No.: 855,014

[22] Filed: Nov. 25, 1977

Related U.S. Application Data

[63] Continuation-in-part of Ser. No. 854,850, Nov. 25, 1977, which is a continuation of Ser. No. 573,915, May 2, 1975, abandoned.

[51] Int. Cl.² ............................ F24J 3/02; G02B 5/14
[52] U.S. Cl. ..................................... 126/271; 350/299
[58] Field of Search ................ 126/270, 271; 350/288, 350/289, 299

[56]  References Cited

U.S. PATENT DOCUMENTS

| 507,999 | 11/1893 | Davis | 137/270 X |
|---|---|---|---|
| 2,291,534 | 7/1942 | Deppe | 126/270 |
| 3,118,437 | 1/1964 | Hunt | 126/270 |
| 3,892,433 | 7/1975 | Blaker | 126/270 X |
| 4,047,517 | 9/1977 | Armberg | 126/270 |

Primary Examiner—Alan Cohan

Attorney, Agent, or Firm—Glenn H. Antrim

[57] ABSTRACT

A plurality of relatively small reflective panels, flat or curved, direct sunlight to an energy pickup which is approximately the size of one of the small reflective panels and are spaced three-dimensionally to utilize available space and support structures economically. Telescope-type drives tilt and rotate the panels individually or by selected groups to focus and maintain concentration of radiant or solar energy on the pickup during the day and seasonally. In one embodiment, energy from the sun is reflected from a first group of reflectors to a second group of reflectors that direct the energy down a tubular concentrator to an energy pickup. Each of the reflectors is curved about a single axis. The axes of the reflectors of the first group are oriented in a direction orthogonal to the direction of the axes of the reflectors of the second group. The first group of reflectors reflect energy in lines to the second group of reflectors, and the second group of reflectors direct the lines of energy received from the first group into concentrated narrow beams to the energy pickup.

3 Claims, 13 Drawing Figures

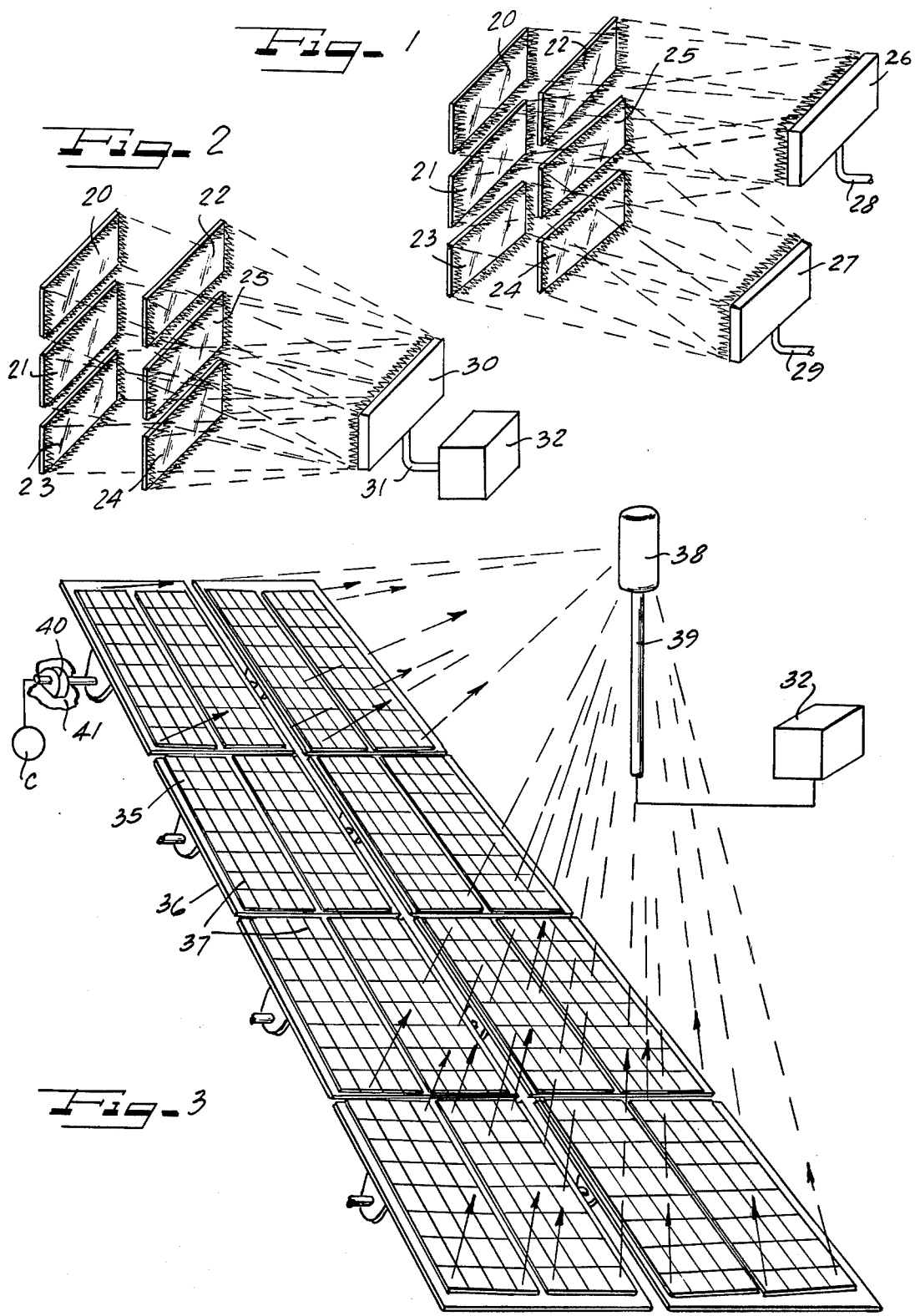

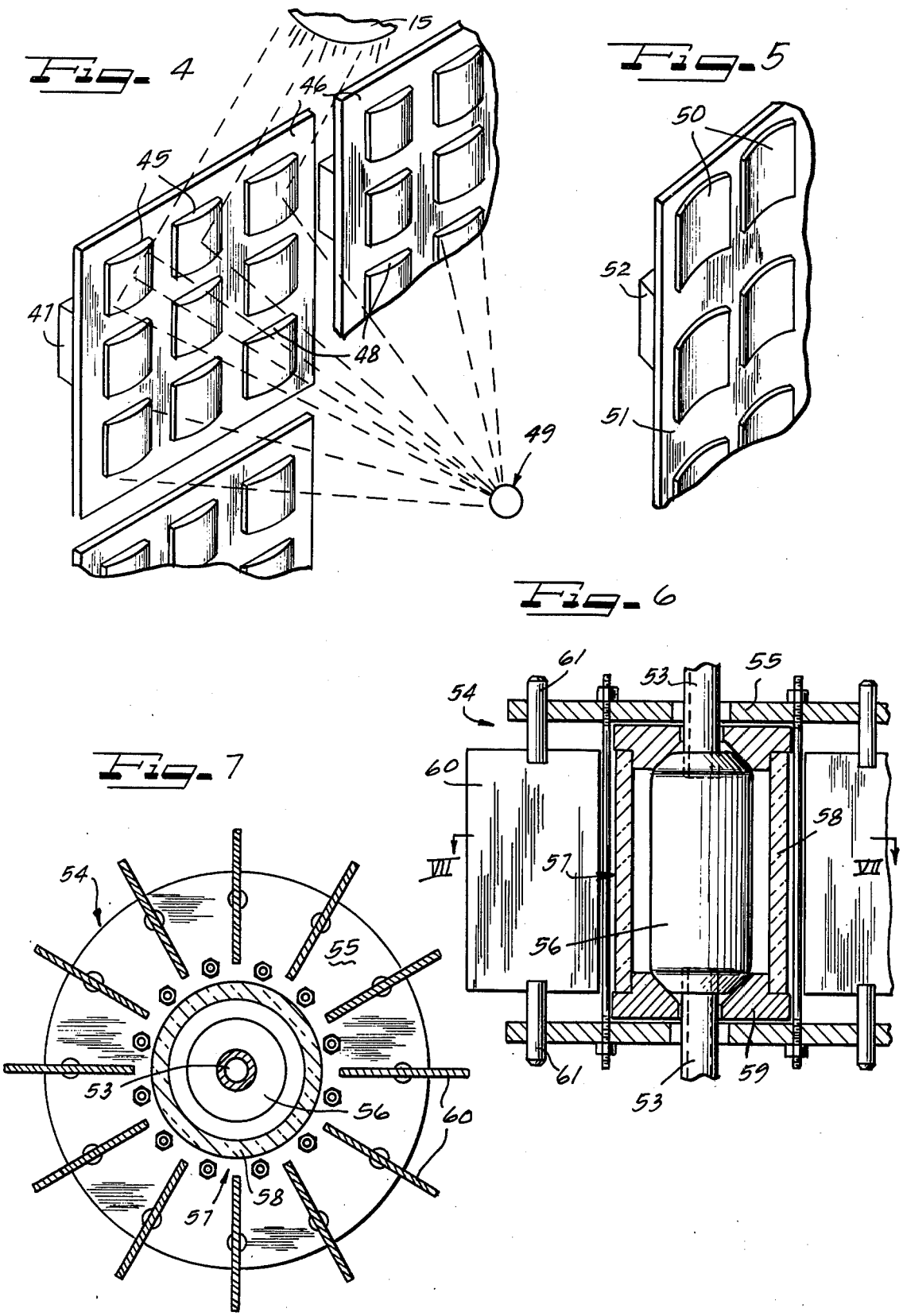

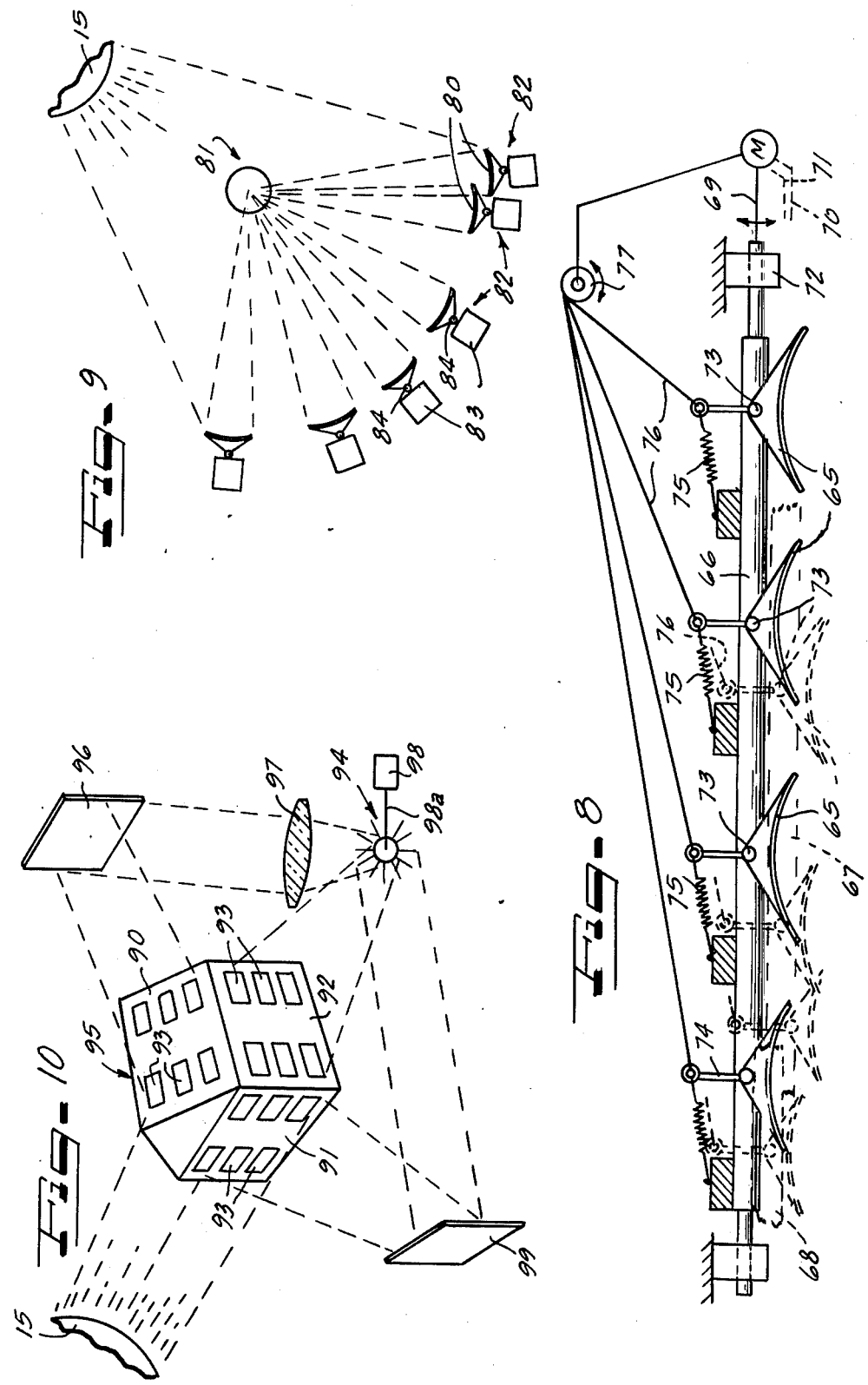

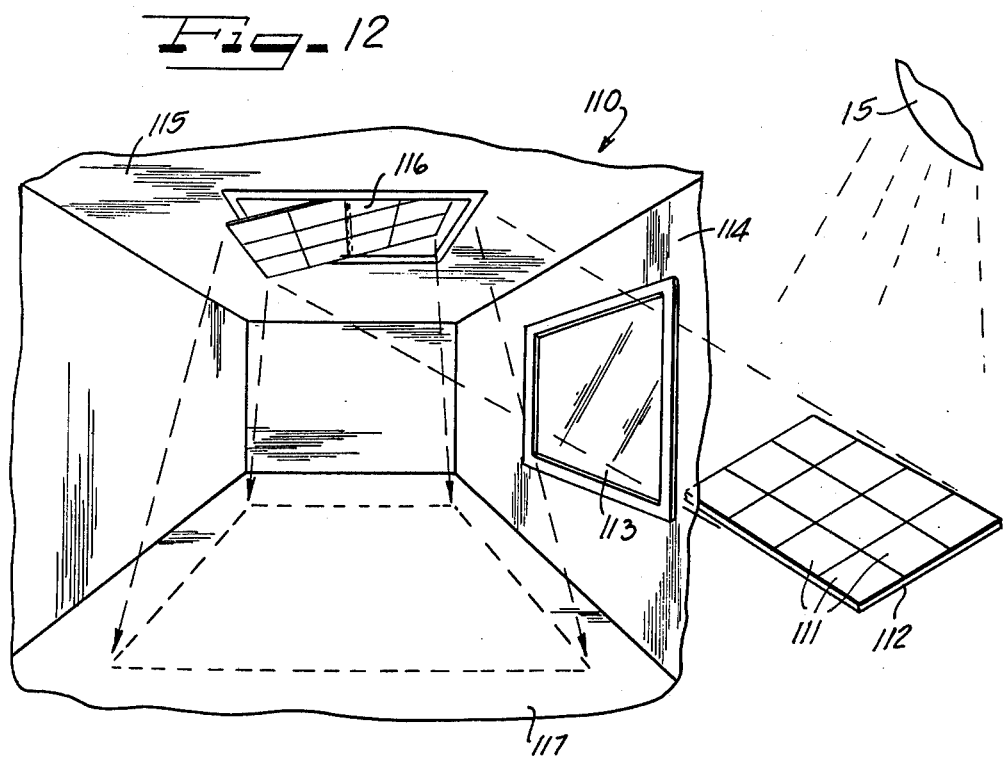
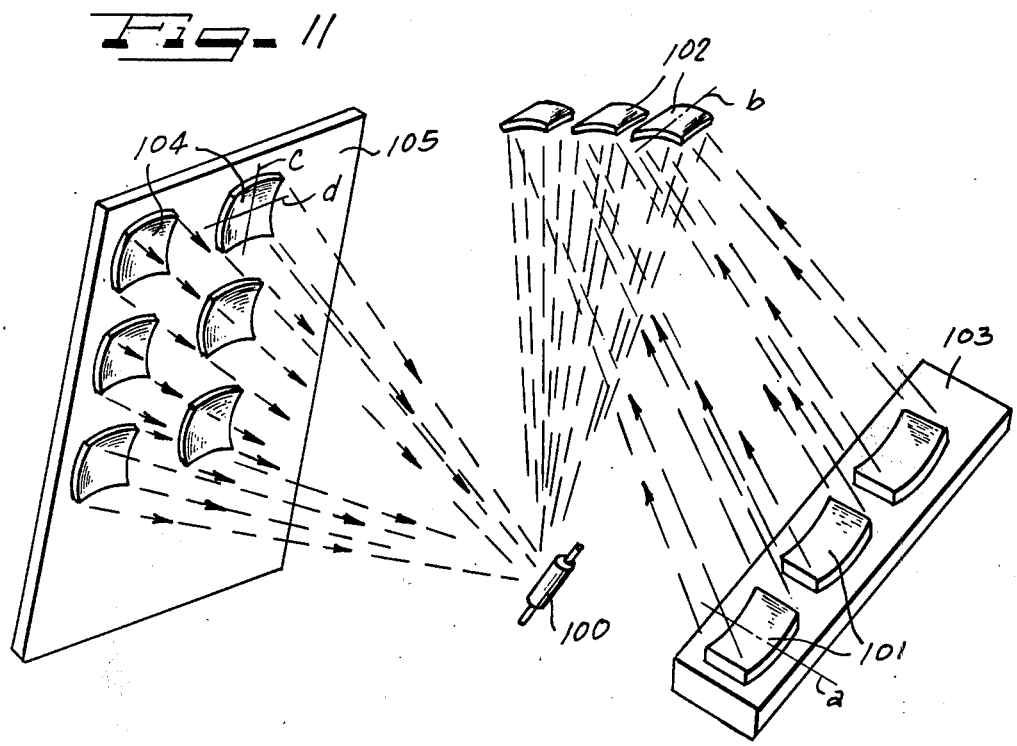

SOLAR ENERGY CONCENTRATOR

BACKGROUND OF THE INVENTION

This is a continuation-in-part application of application Ser. No. 854,850 filed Nov. 25, 1977 that is a continuation of application Ser. No. 573,915 filed May 2, 1975, now abandoned.

This invention relates to devices for concentrating solar energy by means of reflection.

Concentration of radiant energy, especially rays of sunlight, has been accomplished by means of lenses and reflectors in order to increase the energy per unit area arriving at an energy pickup point. Commercial and institutional concentrators employing mirrors have generally used large structures having precisely-formed parabolic or spherical shapes requiring considerable investment of space and resources. Some concentrators have used long mirrors curved in one dimension to reflect solar energy to extended pipes running parallel to the mirrors, one mirror per pipe, with concentration arising from the ratio of the widths of each mirror and each pipe. The use of multiple small relectors to concentrate solar energy was demonstrated by the Greek Navy recently, in duplication of an event from the Greek epics. A large number of sailors each holding a two foot by three foot flat tin reflector were stationed about a harbor and directed sunlight from their reflectors upon a wooden rowboat anchored in the harbor. The boat was set aflame by the heat of coordinated concentration of sunlight from the sailor's reflectors. No effort has been made to apply the teachings of that demonstration to practical uses, as is taught in the present disclosure.

SUMMARY OF THE INVENTION

A number of small reflectors are disposed in pre-aligned, two- or three-dimensional array to concentrate solar energy onto a pickup device such as an oven or heat exchange chamber which is approximately the size of any one of the small reflectors. The reflectors may each be flat or curved and are mounted upon fixed structures in three dimensional alignment. Each reflector is oriented to the sun and rotated by a telescope-type clock drive to maintain concentration of reflected radiant energy upon the small area of the pickup. An energy pickup structure has multiple planar mirrors each oriented longitudinally with, and extending radially from the axis of the pickup and spaced apart circumferentially, to increase further the concentration of light upon an internal core of the pickup. Transparent lenses may be applied to collect and concentrate such energy further between a reflector and the pickup.

In order to avoid placing an energy pickup in a high position, first and second groups of reflectors may be placed in lower and upper positions respectively to reflect energy from the sun to the first group of reflectors, upwardly to the second group of reflectors, and then downwardly to the energy pickup device. Preferably, each reflector of the first group is curved about a single axis oriented in a particular direction, and each of the reflectors of the second group are curved about a single axis oriented in a direction orthogonal to the direction of the axes of the first group. The energy reflected from the second group of reflectors is concentrated, and may be further concentrated and directed through a tubular concentrator to the pickup device.

BRIEF DESCRIPTION OF THE DRAWINGS

FIGS. 1 and 2 are schematic views of reflective panels for demonstrating a principle of the present invention;

FIG. 3 is a partial schematic view of an operating system including a plurality of controlled groups of reflective panels;

FIG. 4 is a fragmentary perspective view showing reflectors having convex, transparent surfaces;

FIG. 5 is a fragmentary perspective view of a group of reflectors, each reflector being curved about a single axis;

FIG. 6 is a plan view, partially in section, of a pickup device with insulating and reflecting means;

FIG. 7 is a cross-sectional view taken on line VII—VII of FIG. 6;

FIG. 8 is a partial schematic representation of means for orienting reflective panels;

FIG. 9 is a schematic view of an arrangement of reflectors;

FIG. 10 is a schematic view of an arrangement of reflectors including reflectors on a building and the use of a converging lens;

FIG. 11 is a schematic diagram showing the use of reflectors curved about orthogonal axes;

FIG. 12 is a perspective view showing reflectors directing sunlight to the interior of a building.

DESCRIPTION OF THE PREFERRED EMBODIMENTS

Figure 13:
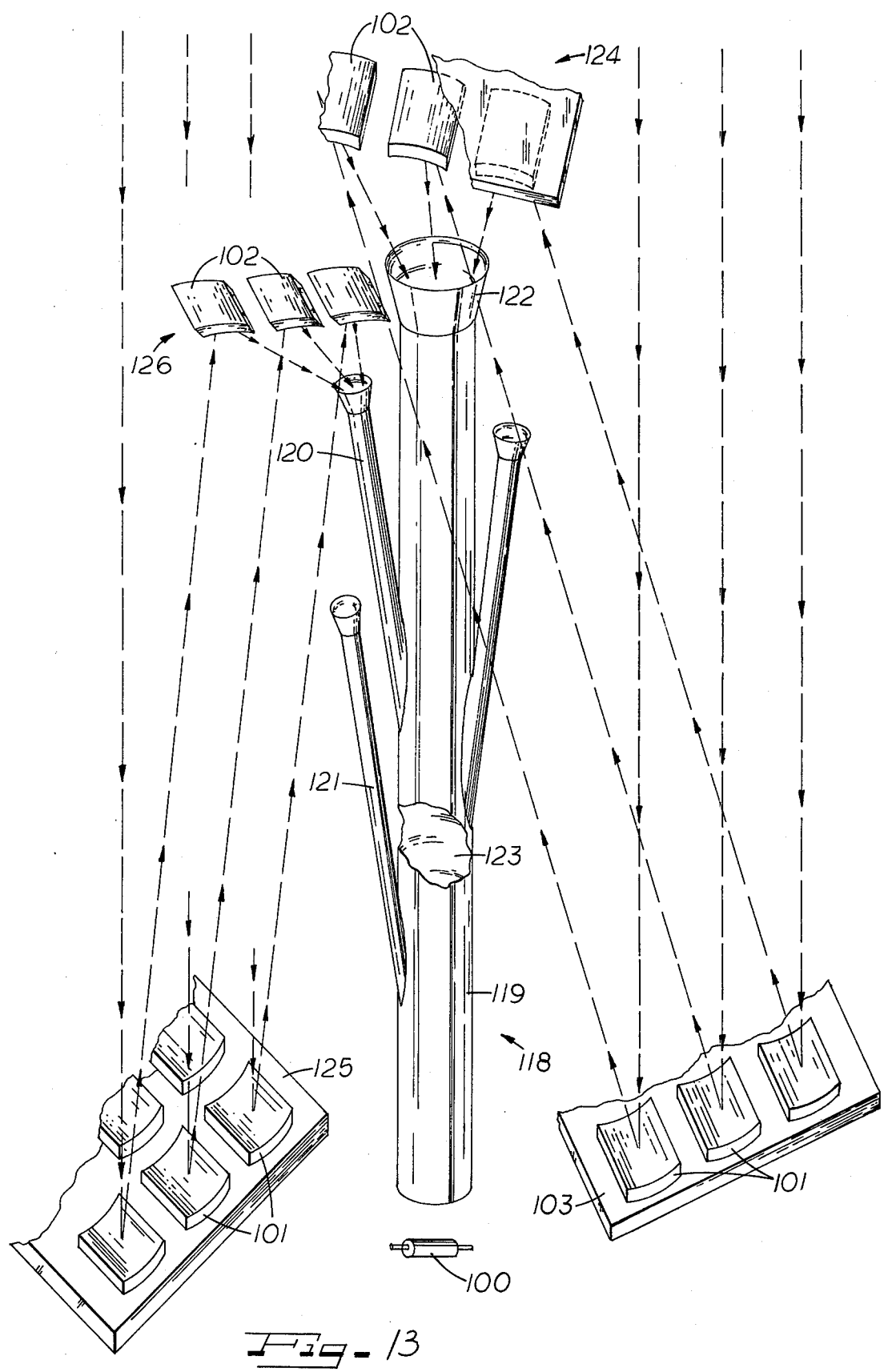
FIG. 13 is a fragmentary perspective view showing double reflection from groups of reflectors, each reflector being curved about a single axis, and a tubular concentrator for directing energy from the reflectors to a pickup device.

FIGS. 1 and 2 of the drawings depict a fundamental principle of the present invention. In FIG. 1 a plurality of small reflecting panels 20 and 25 are arranged in a three-dimensional array, each in a location where it will be struck by rays of energy radiated directly from the sun. Spaced from the individual reflectors 20–25 are a pair of energy pickups 26 and 27. Each pickup 26 or 27 is approximately the size of an individual reflector 20, 21, etc. Each energy pickup 26 or 27 converts the solar energy falling upon its surface to heat, electric, or other energy forms and communicates such energy to a point of utilization through a conduit 28 or 29, respectively.

The reflectors 20–22 as shown in FIG. 1 are arrayed to concentrate their reflected sunlight upon the energy pickup 26, while the reflectors 23–25 concentrate solar energy falling thereupon to the pickup 27. Since sunlight falling upon each of three panels is in this embodiment concentrated upon an area the size of one of the panels, the embodiment of FIG. 1 results in a concentration of 3, less whatever losses are incurred in the reflection from each of the surfaces 20–25. Such reflectivity may be from 40% to approaching 100%, depending upon the sophistication of the reflective surfaces used.

FIG. 2 is similar to the embodiment shown in FIG. 1, except that each of the panels 20–25 in this embodiment is arranged to reflect sunlight to a single pickup 30. Then this embodiment will give a solar energy concentration of 6 upon the pickup 30, allowing more transfer of energy from the pickup 30 through the conduit 31 to an energy consumption device shown schematically at 32. Such energy consumption device 32 may be a heat reservoir, a steam generator, a battery, an engine, or any similar device.

FIG. 3 shows an operational embodiment of the present invention. A large number of reflective panels are employed, the number and size of panels depending on the amount of output required. In FIG. 3, some 512 individual reflective panels 35 are provided, arranged into groups of eight panels 36 and sixteen half panels 37. Each reflector 35 is aligned on its half panel 37 and panel 36 to reflect sunlight to a pickup device 38 which is supported in a proper position with respect to the field of reflectors 35 and transmits energy via a conduit 39 to an energy utilization device 32. As shown in FIG. 3, each panel 36 is individually tilted about a shaft 40 by a telescope-type clock control C. Such tilting of the panels 35 increases the time during each day in which concentration of solar energy is possible. Auxiliary devices may, of course, be employed to move one or more bearings 41 supporting the panels 36 to adjust for seasonal variations in the position of the sun.

In the embodiment shown in FIG. 3, where each reflector 35 is 1 foot by 1½ feet in area, and the total device including energy conversion in the pickup 38, the conduit 39, and the utilization device 32, is only 3% efficient, the system will produce 100 horsepower output.

FIG. 4 shows a reflector assembly using a plurality of small flat reflectors 45 disposed in a cluster or closely spaced relative to one another upon multiple panels 46. The panels 46 are in turn mounted upon orientation devices 47 which correspond to the rotating and tilting means C and 40 employed in FIG. 3. Each reflector 45 in this embodiment is fitted or coated with a transparent material 48 which is convex about one axis only and is flush at its rear portion with the mirror or reflector surface 45. Each of the coatings 48 will act as a complete convex lens to light passing therethrough and impinging upon reflector 45. The effect of the coated reflector is to collect and converge light rays without any curve to the mirror 45 itself. Individual reflectors 45 on each panel 46 are oriented to converge light rays falling upon them onto the pickup 49 as in FIG. 3 regardless of the convergent coatings on the mirrors, further increasing concentration of energy from this embodiment. Thus, in FIG. 4, rays of light from the sun 15 will strike the reflectors 45 on the panels 46 and in passing through the transparent coating 48 be converged and also re-directed by the reflector 45 to concentrate upon a pickup device 49.

Curved mirrors 50 may also be used in an arrangement otherwise similar to FIG. 4, as shown in FIG. 5. Here the multiple reflecting surfaces 50 are each curved about one axis. A cluster of such surfaces 50 is mounted upon a panel 51 which is oriented to the sun by a telescope-type drive 52 to maintain each of the surfaces 50 concentrating upon the pickup device.

FIGS. 6 and 7 illustrate details of a pickup device 54 suitable for use in any of the other views. The pickup device 54 comprises a frame assembly 55 having upper and lower portions, spacers, and bolts uniting the assembly; these are not specifically numbered but are illustrated to exemplify a conventional utilitarian arrangement. In a core portion of the pickup 16 an energy absorption chamber 56 is fitted with transmission conduits 53 leading to and from the chamber 56 to transfer energy to and from an energy consumption device. Surrounding and containing the energy absorption chamber 56 is a container 57 having double spaced sides 58 with opposite end seals 59 for enclosing an insulating, evacuated space according to the construction of vacuum bottles. However, the sides 58 are transparent to reflect radiant energy.

As best shown in FIG. 7, a plurality of circumferentially spaced-apart, radially-extending double-reflective surfaces 60 are arranged about the chamber 56 and bottle 57. Each surface or vane 60 is supported in the framework 55 by shafts 61, 61 about which the vanes 60 are selectively adjustable by gear or pulley means (not shown) to maximize final concentration of solar energy. The plural vanes 60 in the position shown increase the concentration of energy directed toward the pickup 60 by directing incident rays of energy from the larger diameter of the pickup including the vanes to the smaller diameter of the heat absorption chamber 56 alone, by one or more reflections from and among the vanes 60. The vanes may also function as a safety or control device, being rotatable to shield the chamber 56 partially or entirely from concentrated energy and to scatter unwanted energy, as upon failure of a heat transfer fluid pump or when less energy output is required.

It will be understood that the energy pickup can be utilized to heat a carrier fluid such as in a heat exchanger so that thermal energy can be stored in a heat sink or reservoir. Electrical cells which are heat responsive can also be utilized if desired to convert radiant energy into electrical energy. Steam can also readily be produced by the solar energy concentrator of any of the present embodiments, for direct driving of an engine.

FIG. 8 discloses a mechanism for control of multiple reflectors 65. Reflectors 65 are arranged in a longitudinal row on a common spindle 66, and multiple rows of reflectors 65 arranged in tiers one above another on spindles 67 and 68, respectively below and above the spindle 66. These spindles 66–68 are selectively tiltable about horizontal axes by a motor M driving linkages 69–71 to rotate each spindle in its bearings 72. The reflectors 65 are rotated about their axes 73 on the spindles 66–68 by arms 74 biased in one direction by springs 75 attached to the respective spindles 66–68, and biased in the other direction by flexible cables 76 each affixed at one end to an arm 74 and at the other to a rotatable take-up cam 77 also driven from the motor M.

FIG. 9 shows a further alternate embodiment of the invention of the present application which demonstrates the applicability of the invention to use with existing structures. Light from the sun 15 falls upon a number of small reflectors 80 which are spaced about a pickup device 81. The reflectors 80 are each curved in a single dimension, here about an axis vertical to the drawing. The radius of curvature of each of the reflectors 80 is chosen to achieve a desired concentration upon the pickup 81. Thus, a parabolic reflective surface 80, for example, will collect rays of light and focus the concentrated beam at a focal point corresponding to the location of the pickup 81. Reflector assemblies 82 as shown in FIG. 9 may be placed in any 2- or 3-dimensional arrangement about the pickup 81, depending upon spacing and location of existing structures to which such assemblies 82 may be mounted. However, by way of example, FIG. 9 shows a plurality of reflector assemblies 82 which are spaced apart from one another in non-uniform circumferential spacing intervals. Further, such assemblies are spaced from the pickup 81 in non-uniform radial spacing intervals, and finally the assemblies 82 are not co-planar with one another. Also shown in FIG. 9 in schematic form are telescope-type drive means 83 which operate through linkages 84 upon each individual reflector 80 to rotate and tilt the reflector 80 to maintain proper orientation between the sun 15 and the pickup 81 during a desired period of each day and/or season.

Also in accordance with the principles of the present invention, FIG. 10 shows schematically an architectural structure such as a house fitted on several surfaces 90, 91, and 92 thereof with multiple relatively small (1 to 4 feet per side) flat reflectors 93. Each reflector 93 on each panel 90–92 is oriented to reflect energy from the sun 15 either directly or indirectly to an energy pickup device shown schematically at 94.

Rays of light and other radiated energy from the sun 15 striking the roof panel 90 will fall on a number of reflectors 93 placed thereon. The roof panel 90 is illustrated as constituting a covering for a generally A-shaped roof structure so that each roof panel is angularly inclined relative to vertical and horizontal planes. These reflectors 93 on the panel 90 of the house 95 will be oriented during a substantial portion of the day to reflect energy from the sun 15 and direct it to a second larger, flat reflector 96. The energy is again reflected by reflector 96 and is collected and focused through a converging lens 97 to impinge finally upon the pickup device 94. The pickup device 94 directs the energy to suitable utilization means 98 via a conduit 98a.

Solar energy falling on panel 91 of the house 95 will impinge upon reflectors 93 also located thereon, and thence be directed to and concentrated upon a second reflector 99 which in turn is oriented to direct solar energy to the pickup device 94 as previously, except from a different direction.

Also in accordance with the principles of the invention, rays of light energy falling on the third panel 92 of the house 95 may be reflected and concentrated by reflectors 93 directly upon the pickup device 94. The reflectors 93 on the roof panel 90 may be arranged in parallel planes, since collection and concentration of solar energy is accomplished chiefly by the lens 97. For panels 91 and 92, however, the mirrors 93 must be arranged to concentrate sunlight upon the first reflection. Depending upon the required duration of energy collection, the reflectors 93 on the house 94 may be oriented to the sun continuously, or for a few hours each day, by such devices as telescope drives.

FIG. 11 discloses, in accordance with the principles of the present invention, two further methods of using multiple small reflecting surfaces to concentrate solar energy at minimum expense in reflective materials and fabrication thereof. In the first embodiment, solar energy is concentrated upon an energy pickup 100 by two sets of mirrors, each curved in one dimension only. The first reflectors 101 pick up incident sunlight and direct it to second reflectors 102. Each of the reflectors 101 and 102 are curved about a single axis a or b, respectively, and the axes a and b are arranged 90° from one another. Thus the first mirrors 101 will concentrate sunlight falling from them in a first direction, while the second mirrors 102 will concentrate the sunlight in a transverse direction. Thus, the sunlight falling upon the pickup 100 will be in the form of a square or rectangle of a size reduced from that of either of the reflectors 101 and 102. The reflectors 101 are shown mounted on a panel 103 which may be oriented as described elsewhere herein to intercept and redirect sunlight as required.

In the second embodiment shown in FIG. 11, reflectors 104 are curved in two dimensions, about axes c and d. These reflectors 104 serve to concentrate sunlight upon the pickup device 100 with only a single reflection. As before, the multiple reflecting surfaces 104 are mounted upon a panel 105 for convenient orientation to the sun daily and seasonally.

FIG. 12 shows a solar interior illuminator system by which the sun 15 may be used to illuminate a room or enclosure 110. Rays from the sun 15 fall upon a number of reflective panels 111 arranged upon a movable surface 112 outside the room 110. Light from the sun 15 falling upon the reflective panels 111 is concentrated and directed by the panels 111 through a window or other aperture 113 in a wall 114 of the room 110. The sunlight is concentrated by the surfaces 111 into a narrowing or converging beam to pass through the window 113. Affixed to a ceiling 115 of the room 110 is a diffuser surface 116 which reverses the convergence of the beam from the reflectors 111 and spreads the light over a substantial portion of the floor 117 of the room 110.

The solar energy concentrating system shown in FIG. 13 utilizes double reflection obtained by the first and second groups of reflectors 101 and 102, respectively, shown in FIG. 11. Through the use of double reflection, simple reflectors can be used, and the groups of second reflectors 102, rather than the energy conversion device 100, is spaced above the ground. Energy from the second or upper groups of reflectors 102 is transmitted through a substantially vertical tubular reflecting concentrator 118 to the energy conversion device 100. In addition to a main tubular structure 119, the concentrator 118 may have at points spaced along its length a plurality of branches 120 and 121. The branches 120 and 121 extend upwardly at a sharp acute angle with respect to the main tubular structure 119. The main structure 119 has its upper end 122 flared, and likewise the upper ends of the branches are flared. A portion of the wall of the tubular structure 119 is cut away to illustrate that the inside surface 123 of the entire structure is polished to be reflective for directing energy downwardly toward the energy conversion device 100. The angles at which the tubular branches 120 and 121 join the main, straight tubular structure 119 are preferably small acute angles, and therefore energy that is directed down any branch strikes the inside, reflective surface of the main tubular structure at a small angle to be reflected downwardly. If additional directivity is required, simple prisms may be positioned in the lower ends of the respective branches 120 and 121.

Summarizing the operation of the system shown in FIG. 13, radiant solar energy strikes the group 103 of reflectors 101 to reflect lines of energy to respective reflectors 102 in the group 124. As described above, the groups of reflectors 103 are automatically oriented with respect to the position of the sun. The reflectors 102 have their single axes of curvature orthogonal to axes of curvature of the reflectors 101 to concentrate the lines of energy into beams that are directed into the end 122 of the main tubular structure 119. In a similar manner, energy is reflected from a first group of reflectors 125 to a second group of reflectors 126 and into the upper end of the branch 120. As the energy from various branches converge in the main tubular structure 119, a high proportion of the energy collected by the various spaced first groups of reflectors 101 is directed to the energy conversion device 100. Through this system of double reflection, inexpensive reflectors can be used, and the energy conversion device 100 is positioned where it is readily accessible.

I claim:

1. A solar energy concentrator system comprising:

a reflecting concentrator having a main tubular member and a plurality of smaller tubular branches, an energy pickup device operatively connected to an energy utilization device, said main tubular member being substantially upright and having an open lower end directed to said energy pickup device, said branches extending upwardly at small acute angles from respective points spaced longitudinally along said main tubular member, said branches opening into said main tubular member, said main tubular member and said branches having highly polished reflective inner walls, a plurality of first reflectors, a plurality of second reflectors, different ones of said second reflectors being associated with different ones of said branches and being at a level higher than respective upper ends of respective ones of said branches, said first reflectors being associated with certain ones of said second reflectors and being positioned at levels below said respective second reflectors, each of said first and second reflectors having a reflecting surface, said first reflectors being rotated and tilted with respect to respective reference axes during a portion of each day to position said reflecting surfaces thereof for reflecting energy from the sun to respective ones of said second reflectors, and said second reflectors being oriented to reflect solar energy from respective ones of said first reflectors into said upper ends of respective ones of said branches.

2. A solar energy concentrator as claimed in claim 1 wherein said upper ends of said branches are flared for directing said solar energy inwardly.

3. A solar energy concentrator comprising:

a reflecting concentrator having a main tubular member and a plurality of smaller tubular branches, an energy pickup device operatively connected to an energy utilization device, said main tubular having an open first end directed to said energy pickup device and a second end for receiving solar energy, said branches extending from respective points spaced longitudinally along said main tubular member, each of said branches opening into said main tubular member and being at small acute angles with an adjacent portion of said main tubular member in a direction toward said second end, said main tubular member and said branches having highly polished inner walls, and reflecting means positioned with respect to outer ends of each of said branches and oriented with respect to the direction of the sun during a portion of each day to direct solar energy into said outer ends of respective ones of said branches.

* * * * *